(12) United States Patent  (10) Patent No.: US 7,318,520 B2
Golben  (45) Date of Patent: Jan. 15, 2008

(54) FLEXIBLE AND SEMI-PERMEABLE MEANS OF HYDROGEN DELIVERY IN STORAGE AND RECOVERY SYSTEMS

(75) Inventor: P. Mark Golben, Florida, NY (US)

(73) Assignee: Ergenics Corp., Ringwood, NJ (US)

( * ) Notice: Subject to any disclaimer, the term of this patent is extended or adjusted under 35 U.S.C. 154(b) by 663 days.

(21) Appl. No.: 10/950,955

(22) Filed: Sep. 27, 2004

(65) Prior Publication Data

US 2006/0065552 A1    Mar. 30, 2006

(51) Int. Cl.
    *B65B 3/00* (2006.01)
(52) U.S. Cl. ............... 206/0.7; 165/104.12; 34/416
(58) Field of Classification Search ............ 206/0.6, 206/0.7; 34/416; 62/48.1, 46.2; 165/104.12
    See application file for complete search history.

(56) References Cited

U.S. PATENT DOCUMENTS

| | | | |
|---|---|---|---|
| 4,187,092 A | * | 2/1980 | Woolley ............... 62/46.2 |
| 4,396,114 A | | 8/1983 | Golben et al. |
| 4,457,136 A | * | 7/1984 | Nishizaki et al. ...... 62/46.2 |
| 4,548,044 A | * | 10/1985 | Sakai et al. ........... 62/46.2 |
| 4,964,524 A | * | 10/1990 | Halene .................. 220/586 |
| 5,250,368 A | | 10/1993 | Golben et al. |
| 5,532,074 A | | 7/1996 | Golben |
| 5,688,611 A | | 11/1997 | Golben |

* cited by examiner

*Primary Examiner*—David T. Fidei
(74) *Attorney, Agent, or Firm*—Vangelis Economou; IPHorgan, Ltd.

(57) ABSTRACT

A container for use in hydrogen transfer includes structural tubular members and perforations for fluid communication with a central passage covered with a film that is selectively permeable to hydrogen, but not to other gases. The tubular member walls comprise a sturdy material to fix the hydride powder, preventing it from shifting within the container. The hydrogen flow, when being absorbed or desorbed by the metal hydride, will pass through the film both as it is absorbed in the hydride material and also after it is desorbed to pass into the central passage. Simultaneously, the tubular member material, acting as a flexible cover or support for the film, retains contaminant gases within the conduit passage, but permits hydrogen to flow therethrough. Alternatively, a flexible conduit may be interspersed within selected ones of the longitudinal structural members, and hydride material may be packed within the springs, which provide for expansion protection.

17 Claims, 2 Drawing Sheets

FLEXIBLE AND SEMI-PERMEABLE MEANS OF HYDROGEN DELIVERY IN STORAGE AND RECOVERY SYSTEMS

BACKGROUND OF THE INVENTION

1. Field of the Invention

This invention relates generally to an apparatus for transferring, storing and recovering hydrogen from a hydridable material and more particularly to such an apparatus used for transferring hydrogen under pressure while simultaneously removing any gaseous impurities from the hydrogen stream before the hydriding step.

2. Background Art

Hydrogen in the combinant form of water has long been employed in many chemical processes. Recent advances have permitted use of elemental hydrogen in gaseous form in physical processes, such as in heat transfer and electrical energy storage. For example, the fuel cell industry, among others, is continually developing new applications for hydrogen, including fuel cells and heat transfer applications. As a result there is a growing need to store hydrogen safely and conveniently in such applications.

Hydrogen has been stored conventionally as a gas in steel cylinders at high pressures over 2000 psi and at lower pressures as a liquid in insulated containers at very low temperatures. Both methods of storage require comparatively bulky storage containers that are often in need of maintenance. In addition to their unwieldy size, such containers are inconvenient due to the high pressure required for gas storage in cylinders, which can contribute to the possibility of hydrogen gas leakage from the cylinders.

Storage of hydrogen in metallic compounds and alloys, commonly called hydrides, has been recognized as a solution to the problem of hydrogen volatility and safe storage and delivery. Metal hydrides, in the form of metallic powder, can store large amounts of hydrogen at low pressures in relatively small volumes. Low pressure storage of hydrogen is relatively safe and allows the construction of hydrogen storage and delivery containers having forms significantly different than those presently known. Although the weight of the metal hydride powder is a consideration, there may result a concomitant reduction in the weight of the container, since excessively large pressures will not be encountered, and thick container walls are not as significant.

Including use in the storage of hydrogen, metal hydrides are also currently being evaluated for a variety of applications, including for gas compression, solar heat storage, heating and refrigeration, hydrogen purification, utility peak-load sharing, deuterium separation, electrodes for electrochemical energy generation, pilotless ignitors and internal combustion engines.

The processes and equipment used in hydrogen storage is the subject of several commonly assigned U.S. patents, for example, U.S. Pat. Nos. 4,396,114; 5,250,368; 5,532,074 and 5,688,611, the disclosures of which, where appropriate, are incorporated by reference as if fully set forth herein.

An important consideration, particularly addressed in U.S. Pat. Nos. 4,396,114 and 5,688,611, is the delivery of the hydrogen gas between the metal hydride material in a container, usually in powder form, and the end use equipment that utilizes the hydrogen gas, for example, a hydride compressor.

One difficulty that has been investigated is high stress due to the compaction of the powder and expansion thereof during hydride formation. These stress forces are directed against the walls of the storage container and may damage the container itself or the associated internal assemblies unless provision is made to accommodate the impact of the forces. The stress within the powder has been observed to accumulate until the yield strength of the container is exceeded whereupon the container plastically deforms, buckles or bulges and eventually ruptures. Such rupture may become dangerous since a fine, often pyrophoric powder may be expelled by pressurized, flammable hydrogen gas. Small, experimental cylinders of the aforedescribed type have indeed been found to open and burst when subjected to repetitive charging-discharging cycles, because of repeated and progressively more invasive structural and compressive stresses. Additionally, it is undesirable for containers to lose their integrity since any hydrogen stream expelled out of a hydride container may be subject to combustion with possibly catastrophic results.

While the solution to the problem of hydride powder compaction described in the above-described patents are normally adequate to control excessive bulging and deformity of the container by absorbing the stress of metal hydride particles expanding as hydrogen is absorbed therein, that solution has been found to lead to unintended and undesirable results when the hydride materials are subjected to numerous hydrogen absorption/desorption cycles. That is, as the hydriding cycles continue, minute amounts of hydride material become forced into the spaces between the spring loops, eventually forcing themselves between adjacent loops of the spring steel and entering the central conduit through which the hydrogen gas is intended to flow. This reduces flow efficiency, and if enough hydride material is injected into the conduit, blocks hydrogen flow, thereby defeating the purpose of the spring elements. What has been found necessary, therefore, is an inexpensive means for accommodating the stress forces resulting from hydrogen absorption/desorption phenomena, while simultaneously filtering from the gaseous hydrogen the gaseous impurities before the absorption process commences at the metal hydride surface, and also inhibiting the entry of hydriding material into the conduit defined by the springs.

SUMMARY OF THE INVENTION

Accordingly, there is provided a hydrogen storage unit comprising an enclosed container defined by a container wall and having an opening for receiving and discharging gaseous hydrogen within the enclosed container, a flexible hydrogen dispersion assembly including an elongated central longitudinal conduit passage for evenly distributing hydrogen essentially throughout the enclosed container, the passage being defined by a tubular structural member being covered by an encasing film comprising an inert semi-permeable membrane, and metal hydride material packed within the enclosed container between the flexible hydrogen dispersion assembly and the container wall so as to essentially surround the hydrogen dispersion assembly. The tubular structural member may take a number of forms, such as a tube, and including a plurality of pre-stressed hollow springs, substantially filling up the space along the entire length of the tube, that are essentially longitudinally disposed within the tube. A bed of hydride material is packed around the tube, so as to fill the void between the tube and the inner wall of the container. One end of the tube may be sealed, and the other may be open to permit ingress and egress of hydrogen gas therethrough. Alternatively, a flexible conduit may be interspersed within selected ones of the longitudinal structural members, and hydride material may be packed within the springs, which provide for expansion protection.

DETAILED DESCRIPTION OF THE PREFERRED EMBODIMENTS

Figure 1:
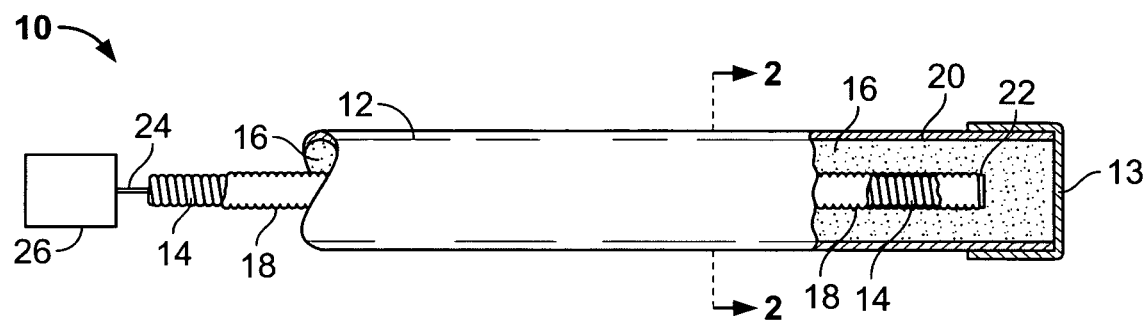
FIG. 1 is a partially cutaway cross-sectional view of a hydrogen system according to the invention.
Figure 2:
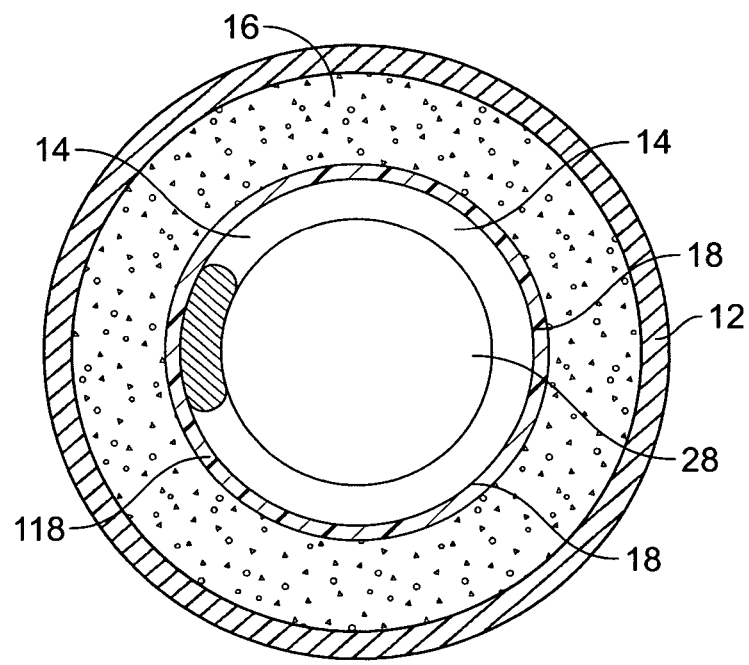
FIG. 2 is a longitudinal cross-section of a second embodiment of the storage container according to the invention.
Figure 3:
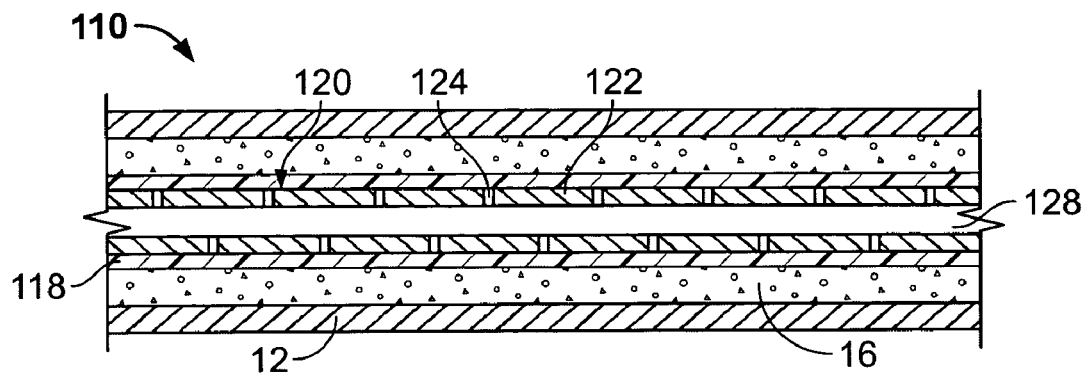
FIG. 3 is a transverse cross-section of the storage container according to the invention taken approximately along line III-III of FIG. 1.

Referring now to FIGS. 1 and 3, a generally tubular compartment unit 10 having a tubular wall 12 is shown in a partially cutaway cross-sectional view is shown in FIG. 1. A hermetically sealed cover 13 is shown to enclose the space with in the walls 12. FIG. 3 shows the same embodiment in a cross-sectional view taken approximately along section line III-III of FIG. 1. For a more detailed description of the structure of the unit 10, including tubular wall 12, helical spring 14, and the hydride material 16 contained between the wall 12 and the outer surface of the spring 14, reference is made to the description of a similar type of hydrogen storage container found in commonly owned U.S. Pat. No. 4,396,114. The description of that patent is incorporated herein by reference, where appropriate.

Significant differences over the device described in commonly owned U.S. Pat. No. 4,396,114 exist, providing a marked improvement and important features of the present invention. For example, miniaturization of the tubular unit 10, while simultaneously providing fluid communication within and through the tubular unit 10 so as to evenly distribute the hydrogen gas throughout the hydride material 16 increases the number and variety of applications in which the inventive device can be used.

In the aforementioned '114 patent, it has been suggested to use flexible helically wound springs, axially extending throughout the tubular unit 10. While the use of such closely wound springs to provide a central hydrogen gas conduit or passage within the center of the spring, are known. However, the spring, usually a metal having a specific wire diameter takes up a significant amount of volume within the tubular walls 12, and also permits all gases, including impurity gases, such as oxygen and methane, to enter into and be absorbed by the hydride material 16. This is undesirable, in that the impurities reduce the hydriding effectiveness of the hydriding material and eventually destroy its usefulness.

Use of a filter sheath, is described in the aforementioned U.S. Pat. No. 4,396,114, without specifying the exact material used, but illustrating it as an apparently woven material, such as a cloth. The sheath described in the '114 patent, although sufficient to stop the ingress of hydride material into the central passageway defined by the spring, causes an increase in the diameter of the spring assembly, and takes up unnecessary space that can be otherwise filled with additional hydride material. Moreover, the sheath in that patent is not selectively permeable to permit only hydrogen passage through the spring, but also permits the unwanted impurity gases.

As shown in FIG. 1, the invention utilizes a spring 14 that is encased within an inert sheath 18, preferably comprising a thin or very thin film of a polyethylene, polysulfone, polypropylene or other inert material permeable to hydrogen gas, as will be more fully described below. Because the film or sheath 18 is very thin, it does not take up space that is otherwise available for packing of hydride material 16. Although necessarily limited by the diameter of the inner walls 12, and of the outer surface of spring 14, the diameter of the spring tube 14 may take any diameter consistent with the need to pack as much hydride material within the unit 10 as is possible. An ideal compromise may be achieved between maximum hydride packing capacity and diameter of the walls 12, as may be necessary for any particular application.

If the distance between any area of hydride material 16 and the conduit passage 20, defined by the internal spring diameter surface, is found to be too great, for example, if a large diameter unit 10 is used, then optionally, a larger spring diameter may be used.

To complete the description of the system 10 illustrated in FIG. 1, may be beneficial to include a stopper or plug 22 that preferably seals off one end of the spring 14 so that all the hydrogen gas is forced to enter the hydride 16 only through the sheath 18, thus filtering out the unwanted impurities and retaining those within the passage 28 (FIG. 3) defined by the inner diameter wall of spring 14.

Alternatively, the plug 22 may itself be porous, for example, by having perforations, and be covered by a film of the same material comprising sheath 18, so that hydrogen gas can flow out of the passage 28 through the permeable plug at the end of spring 14, an so to reach hydride material 16 adjacent the end of the storage container defined by walls 12, for example, hydride material immediately adjacent the container cover 13.

The other end of the spring 14 is preferably sealed against leakage and in fluid communication with a sealed conduit 24 that is itself connected to, and in fluid communication with, a hydrogen gas application unit 26, for example, a hydrogen compressor, etc. as described above. Additional optional structures, not shown, may be included within the hydride material 16, for example, radiation heat sinks (not shown) that are attached to the walls 12, to permit rapid and efficient heat transfer from the external environment to the hydride material 16 during the hydriding process.

In a second embodiment shown in FIG. 3, the spring 14 (FIG. 1) may be replaced by one or more sturdy, rigid tubular members 120 that are permeable to gas. As shown in the second embodiment illustrated in FIG. 3, unit 110 having a central passage 128 formed and surrounded by walls 122 of conduit 120 may be used to each transfer hydrogen gas longitudinally through the unit 110 and into hydride material 16. The material comprising conduit 120 may be metal, plastic, composite or other appropriate material suitable to permit easy hydrogen flow therethrough. Simultaneously, the tube material, acting as a flexible spine for the tube, essentially fixes the hydride powder between the walls of the tube 12 and the inner of conduit 120 and prevents it from shifting about within the container 110.

Perforations 124, or other means for permitting fluid communication through walls 122 are provided at regular intervals and are separated from each other such that no portion of the hydride material 16 is disposed at a distance greater than a predetermined dimension from a perforation 124.

To permit selective penetration of hydrogen gas through the walls 122, a semi-permeable material, similar to that described above, is either disposed within the perforations or, as shown, is disposed as a film or thin sheet 118 of the material encasing the outer surface of walls 122. Thus, fluid communication of impurity gases from the central passage 128 of conduit 120 to the hydride material 16 is restricted, and thereby heavier molecules, such as oxygen, nitrogen, carbon dioxide, methane, etc., are retained within the passage 128 of conduit 120 and do not come into contact with the hydride material 16.

The conduit wall 122, being made of a sturdy material, provides a structural member that can withstand the expansion of hydride while maintaining its integrity and retaining the capability to transfer hydrogen gas through the passage 128 longitudinally. Simultaneously, the film 118 permits only hydrogen to penetrate into the hydride material 16. The remaining elements of the second embodiment may have structures similar to that shown in FIG. 1, and may have other modifications, for example, elements to accommodate hydride expansion, as described above.

Figure 4:
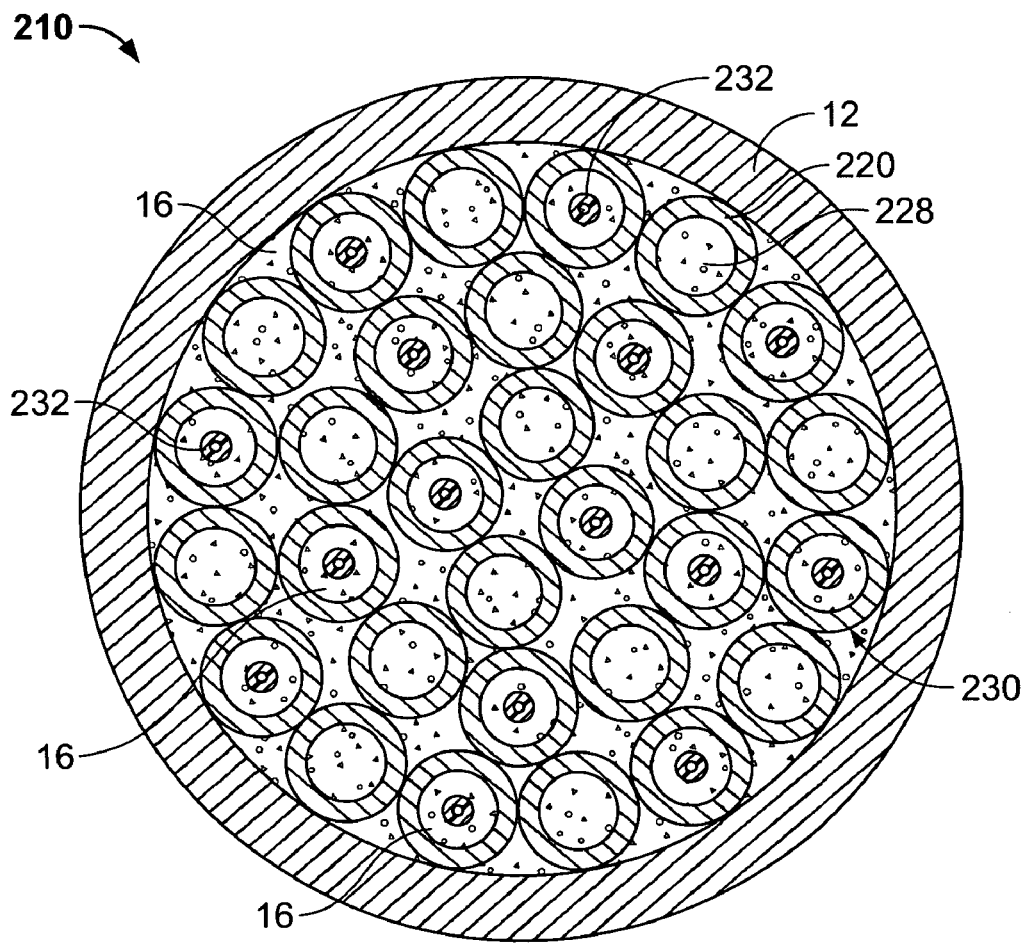
FIG. 4 is a transverse cross-section of an alternate embodiment of the storage container according to the invention.

In a third embodiment, a unit 210, shown in a transverse, cross-sectional view in FIG. 4, the spring 14 shown in FIG. 1 may be replaced by a plurality of sturdy, rigid tubular members 220, so as to provide added protection of the conduit material by a compartmentalization of the separate passageways provided for hydrogen dispersal. These members may be identical to the flexible springs in the prior art devices, but having a smaller diameter, that are permeable to gas through the coils of the sturdy, rigid tubular members 220.

Unlike the prior art devices of the aforementioned '114 patent, however, or the second embodiment illustrated in FIG. 3, the tubular members 220 do not have a surrounding sheath of material to retain the physical barrier to the transposition or shifting of the hydride material 16 contained within the outer wall 12 of the unit 210. Instead, each of the tubular members 220 has a central passage in the form of a central tubular space. This central tubular space within a majority of the tubular members 220 is a container for hydride material 16, as shown. The remaining tubular members, indicated by reference numeral 230, also retain a quantity of the hydride material 16, but in addition each of the tubular members 230 also include a centrally disposed flexible tubular passage comprising a flexible conduit 232 extending throughout the length of the longitudinally disposed tubular members 230, for permitting easy and unencumbered fluid communication of the hydrogen transfer used in the hydriding and dehydriding processes.

The material comprising conduit 232 may be a flexible material, such as plastic, composite or other appropriate material, suitable to permit easy hydrogen flow therethrough. Preferably, the conduits are flexible enough to be bent significantly but still maintaining sufficient integrity to retain the desirable filtering properties, as described above. Thus, hydrogen gas can be almost instantaneously transferred along the longitudinal extent of the unit 210, so as to provide instant pressurization of the hydrogen storage member within the hydride bed. Simultaneously, the tubular members 230, acting as a flexible outer carapace for the flexible conduit 232, essentially fixes the hydride powder between the walls defined by the coils of the of the tubular members 230 and the outer diameter of conduit 232 and prevents it from shifting about within each member 230.

In addition, and as an optional feature that is shown in FIG. 4, additional hydride material 16 may be dispersed between the tubular members 220 and 230, so as to utilize the space within the outer wall 12 efficiently. The tubular members 230 are disposed in a pattern within the framework of the tubular members 220 so that the space within the diameter of the outer wall 12 are provided at regular intervals and are not overly separated from each other, such that no portion of the hydride material 16 is disposed at a distance greater than a predetermined dimension, thus to provide instant access to a source of hydrogen during hydriding, and conversely, for an escape vehicle for hydrogen during dehydriding.

To permit selective penetration of hydrogen gas through the walls, conduits 232 comprise a semi-permeable material, similar to that described above. Thus, fluid communication of impurity gases from the central passage of conduit 232 to the hydride material 16 is restricted, and thereby heavier molecules, such as oxygen, nitrogen, carbon dioxide, methane, etc., are retained within the passage of conduits 232 and do not come into contact with the hydride material 16, either within the tubular members 220 and 230, or outside them.

The coils of the tubular members 220 and 230, being made of a sturdy material such as spring steel, provides a structural member that can withstand the expansion of hydride while maintaining its integrity and permitting longitudinal transfer of hydrogen gas through the conduits 232. That is, the springs may expand somewhat to accommodate the expansion of the hydride material during hydriding, and so to relieve the pressure that may otherwise result, thereby avoiding excessive deformation of the conduits 232. The remaining elements of the third embodiment may have structures similar to that shown in FIG. 1, and may have other modifications, for example, elements to accommodate hydride expansion, as described above.

Preferably, the material of the structural tubular members 220, 230 is a metal, or other good conductor, such that when the members 220, 230 are closely packed within the container 12, the contact between the sides of the members provides for thermal transfer between the members 220, 230, thereby maintaining equalization of the temperature within the hydride bed, and to provide a heat sink to dissipate to the walls of the container 12 the heat of reaction caused during the hydriding process. As is known in the hydride field, the hydriding process is an exothermic reaction that produces heat, and providing a quick or sudden thermal effect to the walls of the container 12 may be especially useful in applications where the hydride device requires heat gradients for operation, for example, in thermal actuators, air conditioning systems, etc.

While the material comprising the inert sheath film 18, 118 or conduits 232 is described as comprising polyethylene, polysulfone, polypropylene or other inert material permeable to hydrogen gas, other materials may also be available for these members. For example, membranes may be used that have been treated with catalysts to be semi-permeable to hydrogen. Alternatively, a mole sieve material may be used to render the flexible membrane material reactive various impurities, i.e., oxygen containing molecules, that may be entrained in the hydrogen gas stream, so that the membrane may convert the impurities to non-reactive, inert molecules. For example, a catalyst may convert a $CO_2$ molecule into oxygen and $CH_4$, and include an oxidation mechanism that binds to the free oxygen and does not permit the oxygen atoms to penetrate the membrane. Use of a mole sieve material can be designed and preselected to enable the membrane to absorb various impurities during absorption, that may be released back into the hydrogen stream during the subsequent desorption or dehydriding process.

Another possible modification to the structure described above, not shown in the present drawings, is a manifold conduit at one or both ends of the longitudinal extent of the unit 210, so that hydrogen gas may be evenly dispersed, without pressure gradients developing between the different conduits 232. Thus, at the intake end, the hydrogen gas may be available at the manifold to equalize the pressure across each of the conduits 232. Optionally, hydrogen gas back flow can be provided for by a second manifold disposed at the end distal, removed from the hydrogen gas intake, so that the hydrogen gas pressure equalization between the conduits 232 may take place even if there is some impediment, such as a blockage, in one or more of the conduits 232.

This invention is described with reference to the preferred embodiments, but alterations, modifications substitutions and other similar changes would become apparent to a person having ordinary skill in the art after having obtained an understanding of the disclosed invention. Accordingly, the invention is limited only by the following claims and their equivalents.

What is claimed is:

1. A hydrogen storage unit comprising:
   a) an enclosed container defined by a container wall and having an opening for receiving and discharging gaseous hydrogen within said container;
   b) a flexible hydrogen dispersion assembly including an elongated central longitudinal conduit passage for evenly distributing hydrogen essentially throughout the enclosed container, the passage being defined by a tubular structural member being covered by an encasing film comprising an inert semi-permeable membrane; and
   c) metal hydride material packed within said enclosed container between the flexible hydrogen dispersion assembly and the container wall so as to essentially surround said hydrogen dispersion assembly.

2. The hydrogen storage unit according to claim 1 wherein said flexible dispersion assembly further comprises a longitudinally extending tube having a predetermined thickness for providing structural integrity and an encasing film comprising a material that is selectively permeable to hydrogen and impermeable to oxygen and other gases.

3. The hydrogen storage unit according to claim 2 wherein said tubular structural member further comprises a helical spring and said film coating is disposed completely over the tubular structural member, said film coating being selectively permeable to hydrogen gas.

4. The hydrogen storage unit according to claim 3, wherein said film coating further comprises an ionically treated membrane.

5. The hydrogen storage unit according to claim 3, wherein said film coating further comprises a thin film made of polyethylene, polysulfone, or polypropylene.

6. The hydrogen storage unit according to claim 3, wherein said film coating further comprises a material that has been treated with a catalyst.

7. The hydrogen storage unit according to claim 3, wherein said film coating further comprises a mole sieve material.

8. The hydrogen storage unit according to claim 2 wherein said longitudinally extending tube further comprises a tubular member having a distribution wall, the distribution wall including a plurality of perforations extending therethrough.

9. The hydrogen storage unit according to claim 6 wherein said distribution wall has perforations that extend through the distribution wall to said central longitudinal conduit passage, and said encasing film is disposed over said perforations.

10. The hydrogen storage unit according to claim 1 wherein said enclosed container further includes a means for absorbing compressive forces of expanding metal hydride material, including springs closely packed into the enclosure to accommodate the expansion of the metal hydride during the hydriding process.

11. The hydrogen storage unit according to claim 2 wherein said longitudinally extending tube further comprises metal.

12. The hydrogen storage unit according to claim 2 wherein said longitudinally extending tube further comprises plastic.

13. The hydrogen storage unit according to claim 2 wherein said longitudinally extending tube further comprises a composite material.

14. A hydrogen storage unit comprising:
   a) an enclosed container defined by a container wall and having an intake opening for receiving and discharging gaseous hydrogen within said enclosed container;
   b) a flexible hydrogen dispersion assembly, including a plurality of elongated central longitudinal conduit passages for evenly distributing hydrogen essentially throughout the enclosed container, each said elongated central longitudinal conduit passage being defined by a tubular structural member surrounding an elongated central longitudinal conduit comprising an inert semi-permeable membrane; and
   c) metal hydride material packed within said enclosed container so as to essentially surround said hydrogen dispersion assembly.

15. The hydrogen storage unit according to claim 14 wherein said metal hydride material is packed within the longitudinally extending tubular structural members.

16. The hydrogen storage unit according to claim 15 wherein a matrix of longitudinally extending tubular structural members include an elongated central longitudinal conduit comprising an inert semi-permeable membrane disposed within selected ones of longitudinally extending tubular structural members.

17. The hydrogen storage unit according to claim 15 wherein said metal hydride material is also packed between the longitudinally extending tubular structural members and the container wall.

* * * * *